United States Patent [19]

Rongved

[11] 4,146,478
[45] Mar. 27, 1979

[54] CLOSED SPIRAL PATH WASTE WATER TREATMENT SYSTEM

[75] Inventor: Paul I. Rongved, Oak Ridge, N.J.
[73] Assignee: Activox, Inc., New York, N.Y.
[21] Appl. No.: 734,315
[22] Filed: Oct. 20, 1976
[51] Int. Cl.$^2$ ............................................. C02C 1/10
[52] U.S. Cl. ........................... 210/195 S; 210/199; 210/219; 210/220; 210/256; 210/261; 210/262
[58] Field of Search ................. 210/14, 15, 195 S, 197, 210/198 R, 220, 221 R, 256, 261, 262, 194, 199

[56] References Cited

U.S. PATENT DOCUMENTS

| | | | |
|---|---|---|---|
| 2,430,519 | 11/1947 | Mallory | 210/256 |
| 3,133,878 | 5/1974 | Kober | 210/15 |
| 3,340,186 | 9/1967 | Weyl | 203/10 |
| 3,448,861 | 6/1969 | Berk | 210/14 |
| 3,495,712 | 2/1970 | Schreiber | 210/220 |
| 3,579,439 | 5/1971 | Meiring | 210/195 S |
| 3,595,783 | 7/1971 | Pflanz | 210/256 |
| 3,760,946 | 9/1973 | Boler | 210/195 S |
| 3,809,242 | 5/1974 | Bosje | 210/195 S |
| 3,817,858 | 6/1974 | Yost | 210/220 |
| 3,900,394 | 8/1975 | Rongved | 210/14 |
| 3,907,679 | 9/1975 | Yost | 210/199 |
| 3,917,532 | 11/1975 | King | 210/256 |
| 3,947,358 | 3/1976 | Schreiber | 210/220 |

FOREIGN PATENT DOCUMENTS 323156  12/1929  United Kingdom ...................... 210/15

Primary Examiner—Frank A. Spear, Jr.
Assistant Examiner—Ernest G. Therkorn
Attorney, Agent, or Firm—Samson B. Leavitt; Michael A. Leavitt

[57] ABSTRACT

A continuous waste water treatment system comprising a reservoir providing a single, closed, continuous, substantially horizontal path through at least two adjacent substantially concentric loops, each of said loops having a beginning and an end, said reservoir being provided with waste water inlet means, treated liquid outlet means, and aeration and circulation means, and wherein said treated liquid outlet means is connected to clarifying means which removes at least some of the sludge carried by the treated liquid and sludge return means is provided to return at least some of the removed sludge to said reservoir.

13 Claims, 7 Drawing Figures

CLOSED SPIRAL PATH WASTE WATER TREATMENT SYSTEM

SUMMARY OF THE INVENTION

This invention relates to a continuous waste water treatment system and more particularly to such a system provided with means for minimizing the space required for sufficiently treating the waste water to yield a substantially pure effluent.

The activated sludge treatment process is one of the best and most widely used of the waste water treatment processes. It utilizes bacterial decomposition for the removal of organic matter in the waste water.

After an initial screening or gravitational settling period has removed any large and/or heavy material in the waste water, such waste water is introduced into a process chamber or reservoir. There it is subjected to aeration (oxygenation) which causes a chemical and/or biological reaction to occur, whereby the colloidal material forms sludge flocs. Bacteria and other microorganisms colonize such sludge flocs and grow and reproduce. The sludge flocs remain suspended in the reservoir but settle readily in a clarifier (settling tank) and can therefore be easily returned to the reservoir while purified water is drawn off. The average age of a sludge floc typically achieves a 30 to 40 day duration and carries strong, well-developed bacteria and microorganisms which are active in converting the organic matter in the waste water into products which are environmentally harmless or easily precipitated or otherwise removed. This "activated sludge" is maintained in the reservoir by returning to the reservoir a portion of the sludge recovered in the clarifier. The separation and recirculation of the activated sludge to the reservoir for further aeration with the waste water results in the continuous purification of the waste water and causes the treated liquid output to be substantially purified.

Activated sludge treatment plants have been constructed and have been found to function successfully. However, certain design criteria have been established from these plants and must be incorporated in any design for efficient operation. It has been found, for example, that the rate of flow of the waste water in the reservoir must be maintained at a minimum of 0.8 to 1.0 feet per second in order to prevent the sludge from settling in, and thereby obstructing, the reservoir. It has also been established that it takes from 8 to 12 minutes for the bacteria and other micro-organisms to use up substantially all the dissolved oxygen in the waste water. Energy efficiency considerations, therefore, require that the waste water be subjected to aeration no more often than approximately once every 8 to 12 minutes. These two design criteria; i.e., a rate of flow at least 0.8 to 1.0 feet per second and an interval of from 8 to 12 minutes between aerations, determine a path length requirement for the reservoir of at least 480 feet between aerations (1.0 foot per second multiplied by 8 minutes). For a circular path this would require a diameter of approximately 150 feet, for a square path a square 120 feet on a side, or for a rectangular path a length of 240 feet (no consideration being given to volume requirements). It is apparent that the cost of allocation of such large land areas for the installation of a waste water treatment plant is often prohibitive. Such land areas are in fact unavailable at any cost in some locations.

Most activated sludge treatment processes which have been disclosed produce a treated liquid output which contains an undesirably high level of nitrate contamination. In my U.S. Pat. No. 3,900,394, the entire disclosure of which is herein incorporated by reference, I have disclosed an improved and more efficient continuous activated sludge sewage treatment process comprising, in continuous manner, injecting raw sewage liquid into a reservoir providing a single horizontal closed loop path, circulating the liquid around said path at a speed of at least about 0.8 feet per second and sufficient to avoid substantial settling of sludge suspended therein, aerating the liquid in said path to promote aerobic decomposition of the sewage and formation of nitrate compounds in said liquid, circulating the aerated liquid around said path for a first distance in which said decomposition proceeds until the liquid is substantially devoid of oxygen at the point of raw sewage injection, circulating the liquid containing nitrate compounds and raw sewage around said path for a second distance in which denitrification proceeds in said liquid until it reaches the next point of aeration in said path, continuously removing treated liquid, for clarification and settling of sludge therein, at a rate approximating the rate of injection of the raw sewage liquid, discharging the resulting clarified liquid effluent and returning at least a portion of the settled sludge to the liquid in said reservoir, the average retention time of the liquid in the reservoir being at least about 24 hours, said second distance being at least about 10% of the sum of said first and second distances. Despite the improvements obtainable by the process described in my aforementioned patent, the apparatus and system described therein does not enable any substantial reduction in the land area required for carrying out the process.

It is an object of this invention to provide a process and system which will not be subject to one or more of the above disadvantages.

Another object of the invention is the provision of such a system employing reduced land areas.

Still another object of the invention is the provision of such a system which is inherently stronger and/or more economical to construct.

Other objects and advantages will appear as the description proceeds.

The attainment of one or more of the above objects is made possible by this invention which includes: A continuous waste water treatment system comprising a reservoir providing a single, closed, continuous, substantially horizontal path through at least two adjacent substantially concentric loops, each of said loops having a beginning and an end, said reservoir being provided with waste water inlet means, treated liquid outlet means, and aeration and circulation means, and wherein said treated liquid outlet means is connected to clarifying means which removes at least some of the sludge carried by the treated liquid and sludge return means is provided to return at least some of the removed sludge to said reservoir.

The above brief description, as well as further objects, features and advantages of the present invention, will be more fully appreciated by reference to the following detailed description of presently preferred, but nonetheless illustrative, embodiments in accordance with the present invention, when taken in conjunction with the accompanying drawings, in which.

Figure 1:
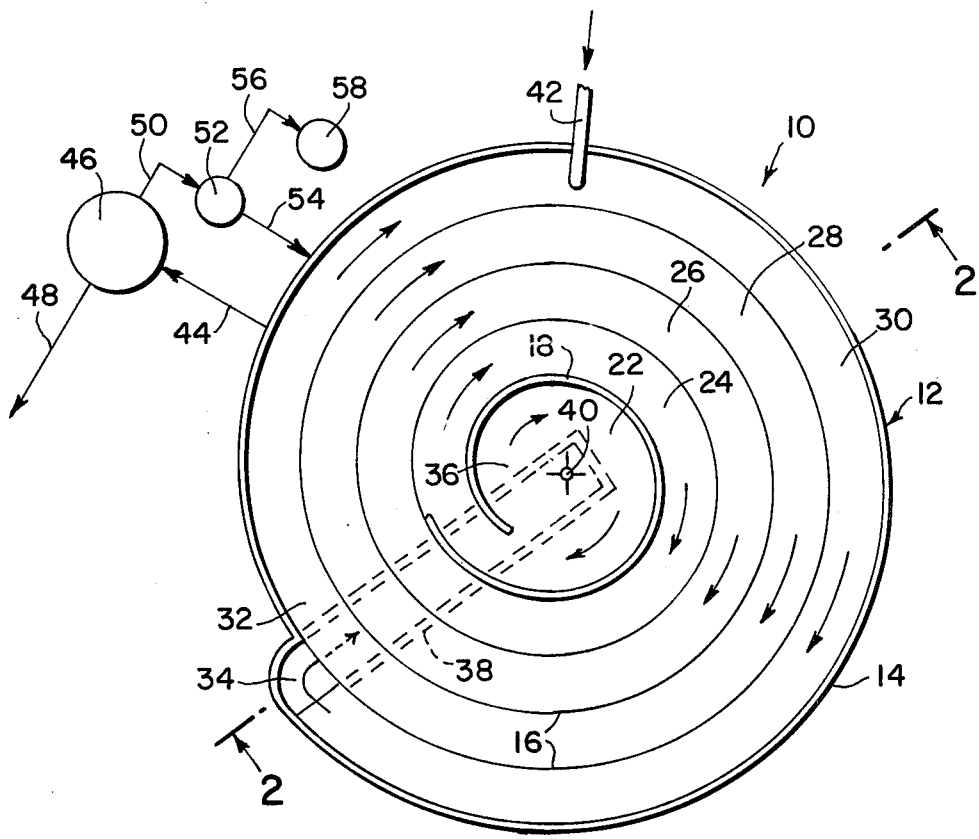
FIG. 1 is a plan view of one preferred embodiment of this invention.
Figure 2:
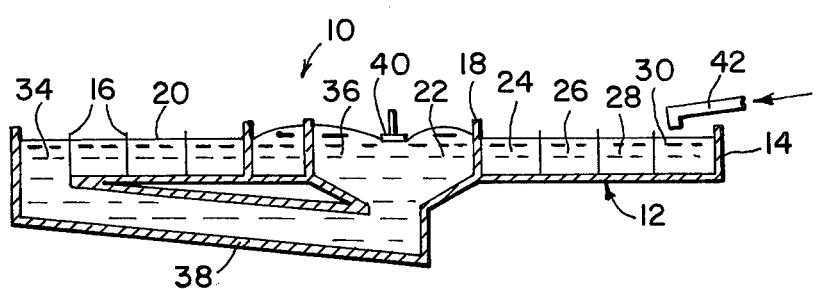
FIG. 2 is a sectional view taken along the line 2—2 of the embodiment of FIG. 1.

Referring now to FIGS. 1 and 2, reference numeral 10 indicates generally an apparatus embodying my invention which comprises a reservoir 12 that is substantially circular in external configuration and which includes external wall section 14, inner wall sections 16, and innermost wall section 18, all of which wall sections are generally spirally shaped. These wall sections (i.e., 14, 16, 18) create a path within reservoir 12 for the waste water 20 under treatment in the form of substantially concentric loops 22, 24, 26, 28 and 30 from the innermost to the outermost. Each such loop has a beginning which connects to the preceeding loop and an end which connects to the succeeding loop (for example, outermost loop 30 begins at 32 where it connects to the end of loop 28 and ends at 34), with the exception of innermost loop 22. The latter loop begins at 36 at the end of the substantially radially directed tunnel 38 which connects the end 34 of outermost loop 30 with innermost loop 22 (best seen in FIG. 2). Inside innermost loop 22 there is located an aeration and circulation means 40 of known construction, as for example a propellor, brush, or paddle wheel configuration rotating about a vertical axis. Also provided is pipe 42 for admitting waste water to be treated (influent) into reservoir 12 and means 44 for removing treated liquid (effluent) therefrom, as for example an overflow pipe. Treated liquid outlet means 44 connects to a clarifying means 46 in the form of a settling tank, which is itself provided with two further connections-outlet pipe 48 for removing purified water from the system and pipe 50 which leads to sludge pump 52. Sludge pump 52 is connected by pipe 54 back to reservoir 12 and by pipe 56 to surplus sludge tank 58.

In operation, waste water 20 is introduced into reservoir 12 through pipe 42 after first being subjected to filtering and settling to remove any large and/or heavy materials. Waste water 20 is then circulated around loop 30, through tunnel 38, to the beginning 36 of loop 22 where it is aerated and impelled by aeration and circulation means 40 into successive loops 24, 26, and 28 back past its entry point at pipe 42. However, circulated waste water 20 is no longer in the same condition as when it first entered reservoir 12. When it first entered it became mixed with water already in reservoir 12, which water carried activated sludge with active bacteria and other micro-organisms which immediately began to attack the organic impurities in the waste water. The volume capacity of reservoir 12 is selected with due regard to both the desired handling capacity of the system (the expected input through pipe 42) and the desired degree of purification-obviously, the longer the waste water is subjected to treatment the purer will be the output. Typically, an average of 24 hours is selected for the waste water to remain within the system and subject to bacterial decomposition, although both longer and shorter periods have been utilized. With a 24 hour period, and a design requirement for aeration once every 8 to 12 minutes, waste water 20 is subjected to approximately 120 to 180 cycles of aeration and decomposition before being removed through treated liquid or outlet means 44. The treated water removed through means 44 is substantially purified but carries with it quantities of activated sludge in suspension. This sludge is allowed to settle out in clarifier 46, from which purified water is removed through pipe 48 by overflow or equivalent means. The activated sludge which is separated from the water is removed from the clarifier through pipe 50 and the action of sludge pump 52. Pump 52 then returns at least some of the activated sludge to reservoir 12 through pipe 54 in order to maintain the activity level within the reservoir, while excess sludge is removed from the system through pipe 56 into surplus sludge tank 58.

By way of example, assume that the width of each of the loops 22, 24, 26, 28 and 30 is 6 feet and the depth of the waste water 20 in reservoir 12 is 4 feet. The radii of the respective loops would then be approximately 4 ft., 10 ft., 16 ft., 22 ft., and 28 ft., and the total combined path length would be approximately 500 feet. The volume of reservoir 12 would then be approximately 12,000 cubic feet or 90,000 gal. and the diameter of reservoir 12 would be about 62 feet. Thus, a substantial reduction in required land area is enabled by my invention. Obviously, the provision of more but narrower loops would yield a longer path length for the same overall dimensions and volume.

The instant invention is particularly suited to carry out my improved denitrification process as disclosed in U.S. Pat. No. 3,900,394. My process requires the injection of raw sewage into the waste water undergoing treatment at a point at which the waste water is substantially devoid of dissolved oxygen. At that point, bacterial decomposition of the organic material carried by the waste water has proceeded to the stage wherein there is substantial nitrification but wherein the bacteria and other micro-organisms are more or less inactive due to a lack of oxygen. The injection of raw sewage stimulates the bacteria and other micro-organisms to act upon the dissolved nitrates to release oxygen therefrom, thereby converting them to more easily disposable products such as nitrogen gas. However, sufficient time must be allowed for this denitrification action to occur before the waste water has its oxygen level increased by passing through aeration means as disclosed in my said patent. I determined that sufficient time is allowed for this action if the raw sewage is introduced into the reservoir at a position at which at least 10% of the path length between the preceding and succeeding aerations means still remains to be traversed. For example, in the embodiment of FIGS. 1 and 2, the raw sewage is introduced through inlet means 42 into outermost loop 30. At that point in loop 30 the waste water is substantially devoid of dissolved oxygen and yet must travel around the balance of the length of loop 30 to its end at 34 and through tunnel 38 before it reaches aeration means 40, such travel distance being at least 10% of the complete cycle from 40 back to 40. This allows sufficient time for the denitrification action to take place.

Figure 3:
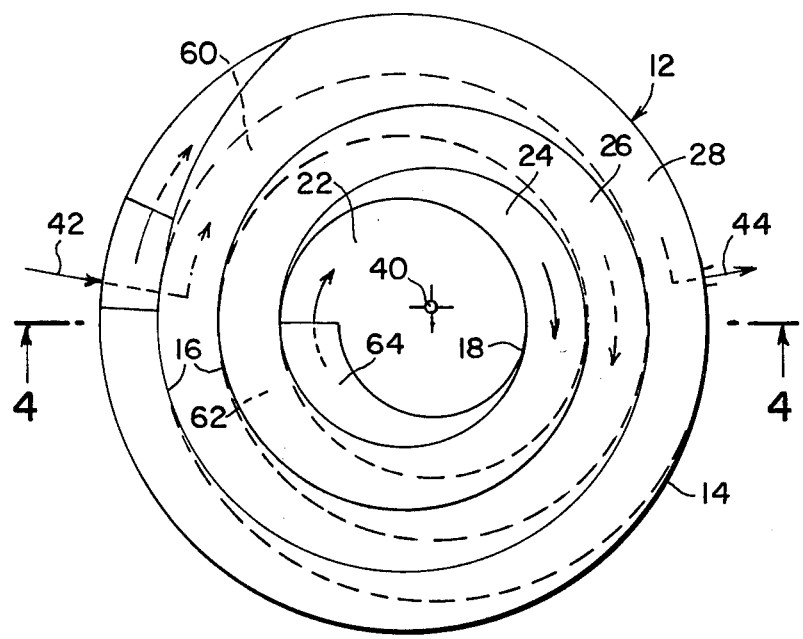
FIG. 3 is a plan view of a second preferred embodiment of this invention.
Figure 4:
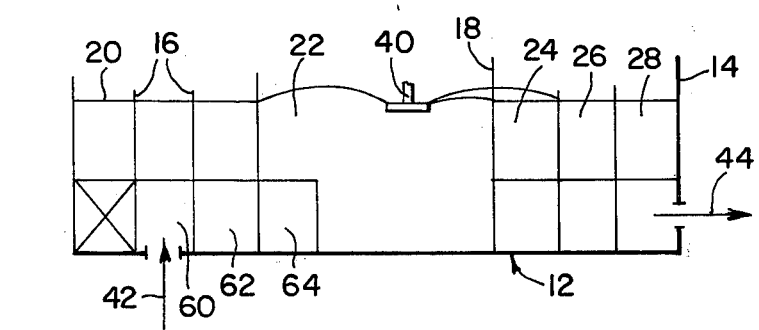
FIG. 4 is a sectional view taken along the line 4—4 of the embodiment of FIG. 3.

Referring now to FIGS. 3 and 4 there is illustrated another embodiment of my invention wherein a second spiral path through a plurality of loops is substituted for the return tunnel 38 in the embodiment of FIGS. 1 and 2. This substitution allows the same overall path length to be provided while requiring even less land area, although there is an increased height requirement. This embodiment may be preferred if the cost of land justifies the increased construction costs. In the description of this embodiment the same reference numerals in the description of the first embodiment will be used so long as no confusion is created. Reservoir 12 is provided with a plurality of substantially spiral loops 22, 24, 26, and 28 created by wall sections 14, 16 and 18 (best seen in FIG. 4). The flow of waste water 20 in this upper level of loops is substantially clockwise and outward as illustrated, although either direction is operative. Aeration and circulation means 40 is provided at the center of innermost loop 22 and may be of the same type as used in the first embodiment. However, in place of return tunnel 38 at the end 34 of the outermost loop 30, there is provided a second set of substantially spiral loops 60, 62, 64 through which waste water 20 flows in a clockwise but inward direction. Waste water inlet means is provided at 42 and treated liquid outlet means is provided at 44. Outlet means 44 would typically be connected to clarifier means 46, etc., as shown in FIG. 1 which is therefore not shown in FIGS. 3 and 4.

Figure 5:
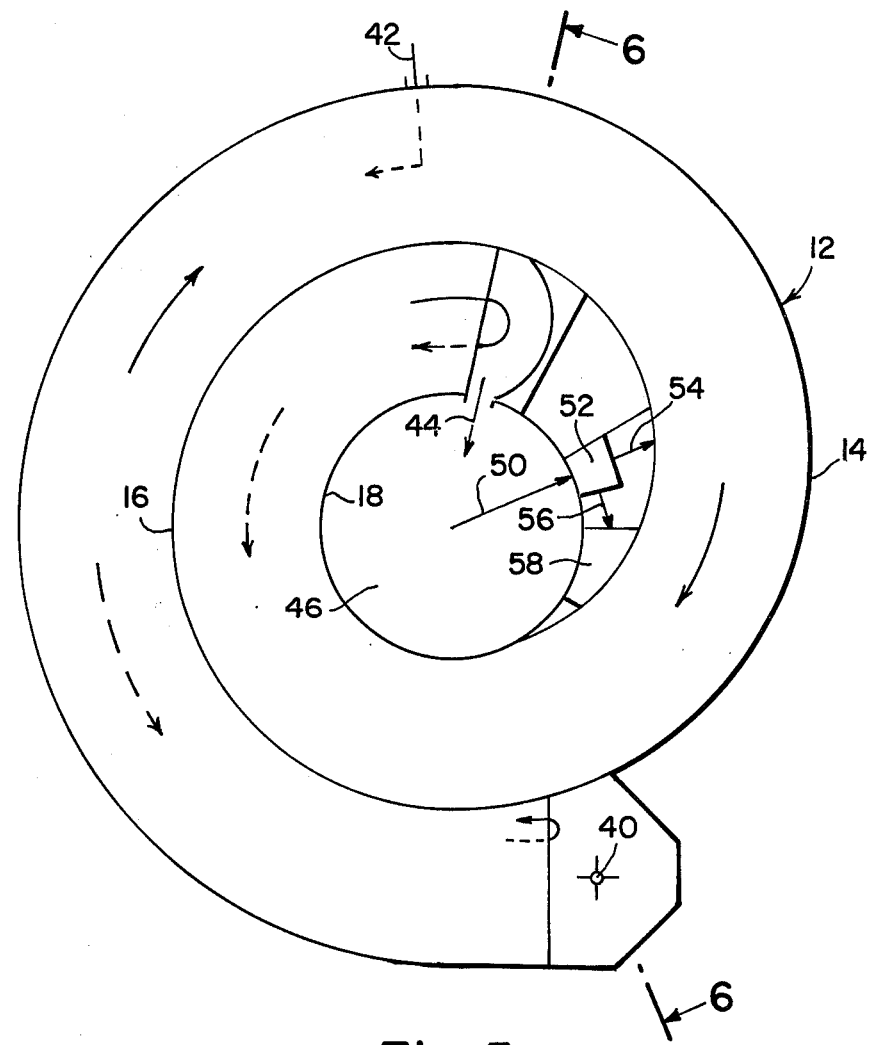
FIG. 5 is a plan view of a third preferred embodiment of this invention.
Figure 6:
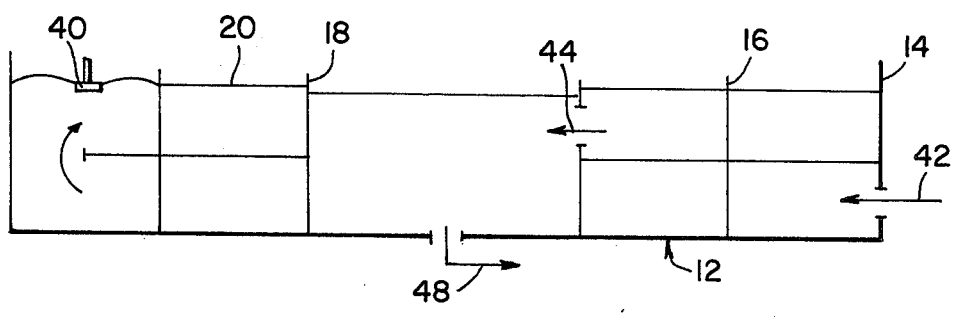
FIG. 6 is a sectional view taken along the line 6—6 of the embodiment of FIG. 5.

The third embodiment of my invention is illustrated in FIGS. 5 and 6 and is similar to the second embodiment in that two levels of substantially spiral loops are provided. In this embodiment, however, aeration and circulation means 40 is located near the perimeter of reservoir 12 and propels waste water 20 in a clockwise and inward direction through the upper loops and in a counter-clockwise and outer direction through the lower loops. Waste water inlet means is located at 42 and introduces raw sewage into the outer loop of the lower level. Treated liquid outlet means 44 removes treated water to clarifier 46 as previously described. In this embodiment, clarifier 46 is located inside the innermost loop where it can share innermost wall section 18 with the innermost loop. Also located inside the innermost loop is outlet means 48, sludge pipe 50 leading to sludge pump 52, sludge return pipe 54 leading back into reservoir 12, and surplus sludge pipe 56 leading to surplus sludge tank 58 (best seen in FIG. 5).

Figure 7:
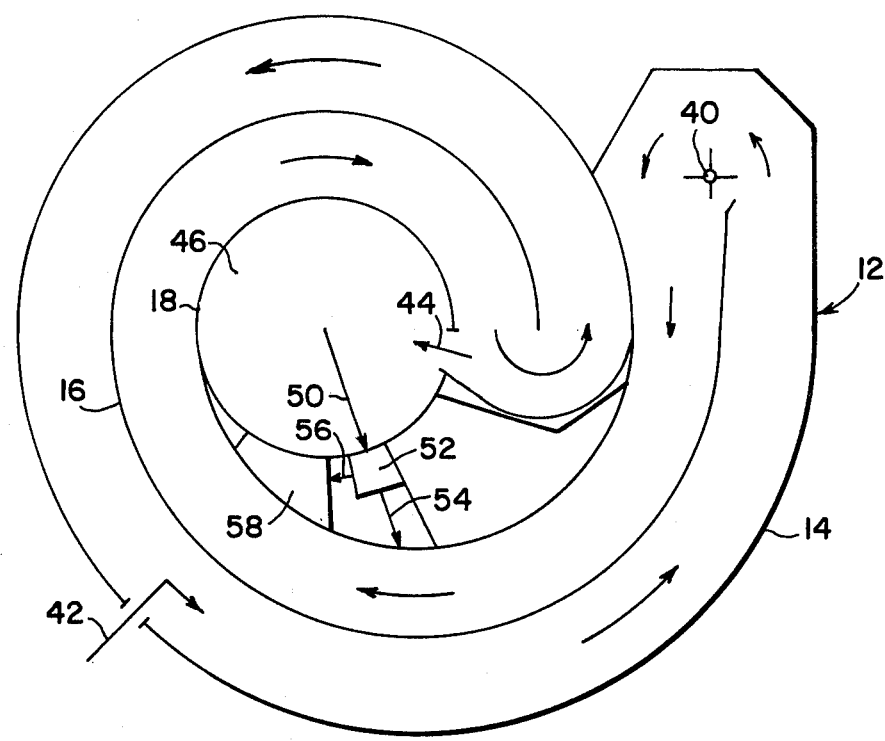
FIG. 7 is a plan view of a fourth preferred embodiment of this invention.

The fourth embodiment of my invention is illustrated in FIG. 7 and also includes two sets of substantially spiral loops. However, in this embodiment the two sets of loops are placed in the same level in "nested" configuration such that waste water 20 flows in a more or less serpentine fashion through the loops under the action of aeration and circulation means 40. Treated liquid outlet means 44, clarifier means 46, sludge pipe 50, sludge pump 52, sludge return pipe 54, surplus sludge pipe 56, and surplus sludge tank 58 are located inside the innermost loop in a manner similar to the embodiment of FIGS. 5 and 6.

Alternatively, and according to another embodiment of my invention, the positions of aeration means 40 and of clarifier and separation means 46-58 may be reversed.

In addition to the efficient use of space enabled by my invention it should also be noted that substantially (at least about 80%) all of the walls are curved so that they are more stable and stronger than straight walls of equal thickness. Further, only the outermost wall bears the full pressure of the contained water while the inner walls have water on both sides and are therefore subjected to very little stress. This contributes to stability, durability and ease of construction. The walls may be constructed of any suitable material such as wood, plastic, metal (e.g. stainless steel) or concrete (preferably reinforced). When, as preferred, the upper edges of the walls of the apparatus of my invention are at or below earth level, suitably shored earth outer walls may, preferably, be employed.

It will be understood that any of the various embodiments of my invention may be provided with multiple aeration, agitation and propulsion means, and also multiple waste water inlet and outlet means, in which case each inlet means, in accordance with the invention described and claimed in my aforesaid patent, is positioned upstream from the next aeration means at a distance which is at least about 10% of the path length or distance between the preceding, upstream aeration means and the succeeding or downstream aeration means. The inlet means may inject the waste water or raw sewage in the direction of flow, thereby lessening the energy requirements of the aerating, propulsion means, and against the direction of flow, thereby increasing turbulence, agitation and more rapid mixing of the injected fluid with the circulating fluid in the reservoir. In addition, the reservoir may be provided with heaters and/or insulating means to increase the rate of decomposition and also to decrease the viscosity of the circulating fluid, thereby further reducing the energy requirements of the propulsion means.

This invention has been disclosed with respect to preferred embodiments, and it will be understood that modifications and variations thereof obvious to those skilled in the art are to be included within the spirit and purview of this application and the scope of the appended claims.

What is claimed is:

1. A continuous waste water treatment system comprising a reservoir providing a single, closed, continuous, substantially horizontal spiral path through at least three adjacent substantially concentric and spirally related loops, each of said loops having a beginning and an end, said reservoir being provided with waste water inlet means, treated liquid outlet means, and aeration and circulation means, and wherein said treated liquid outlet means is connected to clarifying means which removes at least some of the sludge carried by the treated liquid and sludge return means is provided to return at least some of the removed sludge to said reservoir.

2. A system as defined in claim 1 wherein the path between the end of the outer loop and the beginning of the inner loop is substantially radial in direction.

3. A system as defined in claim 2 wherein at least one of said aeration and circulation means is located inside the inner loop of said substantially spiral path.

4. A system as defined in claim 3 wherein said waste water inlet means is located in said single, closed, continuous path such that the path distance between said inlet means and the next said aeration means in the flow direction is at least 10% of the path distance between the last preceding aeration means and said next aeration means.

5. A system as defined in claim 1 wherein said loops form a first substantially spiral path and the path between the end of the outer loop and the beginning of the inner loop forms a second substantially spiral path.

6. A system as defined in claim 5 wherein said first substantially spiral path lies in a first substantially horizontal plane and said second substantially spiral path lies in a second substantially horizontal plane adjacent said first horizontal plane.

7. A system as defined in claim 6 wherein said waste water inlet means is located in said single closed continuous path such that the path distance between said inlet means and the next said aeration means in the flow direction is at least 10% of the path distance between the last preceding aeration means and said next aeration means.

8. A system as defined in claim 7 wherein at least one of said aeration means is located at or adjacent the center of the inner loops of said substantially spiral paths.

9. A system as defined in claim 7 wherein said clarifying means is located at or adjacent the center of the inner loops of said substantially spiral paths.

10. A system as defined in claim 5 wherein said first and said second substantially spiral paths lie in substantially the same horizontal plane.

11. A system as defined in claim 10 wherein said waste water inlet means is located in said single closed continuous path such that the path distance between said inlet means and the next said aeration means in the flow direction is at least 10% of the path distance between the last preceding aeration means and said next aeration means.

12. A system as defined in claim 11 wherein said clarifying means is located at or adjacent the center of the inner loops of said substantially spiral paths.

13. A system as defined in claim 11 wherein at least one of said aeration means is located at or adjacent the center of the inner loops of said substantially spiral paths.

* * * * *